Patented Oct. 11, 1949

2,484,067

UNITED STATES PATENT OFFICE 2,484,067

PRODUCTION OF UNSATURATED ORGANIC COMPOUNDS

Albert B. Boese, Jr., Pittsburgh, Pa., assignor to Carbide and Carbon Chemicals Corporation, a corporation of New York No Drawing. Application January 29, 1949, Serial No. 73,661

18 Claims. (Cl. 260—526)

1

This invention relates to the production of unsaturated carboxylic acids, and more especially it concerns their production by a process involving the reaction of ketene with unsaturated aldehydes in general, including aromatic aldehydes, in the presence of a strongly acidic condensing agent or catalyst such as those hereinafter described. Those catalysts containing an acidic boron compound are very effective; and boron halides such as boron trifluoride provide outstanding yields of the desired unsaturated acids. The intermediate polymeric product which is initially formed is readily convertible to an unsaturated carboxylic acid by heating with a strong mineral acid, or by other treatment effecting fission of the lactone ring. The esterification of the intermediate product with a lower aliphatic saturated alcohol or other suitable esterifying agent, in the presence of an esterification catalyst, yields directly the corresponding unsaturated carboxylic acid ester, which readily is recoverable from the reaction mixture by distillation under vacuum or by other suitable treatment.

From evidence available it appears probable that the reaction between ketene and the aldehydes occurs in two stages, both of which are catalyzed by the strongly acidic catalysts of the invention, and particularly by boron trifluoride. First, ketene probably reacts with the carbonyl group of the aldehyde to form a polymeric β-lactone, which then undergoes internal rearrangement to form the unsaturated carboxylic acid. The intermediate polymeric viscous liquid has not been definitely proved to be a β-lactone, but this structure agrees with the known facts of its formation and decomposition.

Among the acidic catalysts or condensing agents found particularly useful in this process may be mentioned the boron halides such as boron trifluoride; other acidic boron-containing catalysts such as boric acid-oxalic acid mixtures, boric acid-salicylic acid mixtures, and boron triacetate; strongly acidic volatile halides of the trivalent metals such as aluminum chloride, boron trifluoride and ferric chloride; and other strong acidic condensing agents such as sulfuric acid and benzene sulfonic acids.

The present invention is based in important part upon the discovery that, in the presence of acidic catalysts of the type described, ketene reacts with unsaturated aldehydes, including aromatic aldehydes, to provide high yields of unsaturated carboxylic acids while, at the same time, the reaction is so conducted that any tendency of the catalyst to polymerize the reactants is

2 inhibited or lowered, thereby preventing the expected polymerization losses. Aldehydes particularly useful in the process include aliphatic, aromatic and mixed aliphatic-aromatic aldehydes having only carbon and hydrogen in the molecule in addition to the aldehyde group, such as crotonaldehyde, benzaldehyde and cinnamaldehyde; and particularly useful in the process are the $\alpha,\beta$-olefinic aldehydes and the diolefinic aldehydes wherein the double bond connected with a carbonyl oxygen atom is conjugated with a carbon-to-carbon double bond in the molecule. Among suitable $\alpha,\beta$-olefinic aldehydes are acrolein, the $\alpha$- and $\beta$-alkyl substituted acroleins, such as $\alpha$-ethylacrolein and $\alpha$-methyl-$\beta$-ethyl acrolein, $\alpha$-phenyl acrolein, crotonaldehyde, the $\alpha$- and $\beta$-alkyl substituted crotonaldehydes such as tiglic aldehyde, $\alpha$-methyl cinnamaldehyde, $\gamma$-benzyl crotonaldehyde, and the diolefinic aldehydes such as hexadien-2,4-al-1 and citral.

In general, in the practice of the invention, the first step of the process, involving the formation of the polymeric intermediate product, can be effected by reacting ketene with an unsaturated aliphatic or aromatic aldehyde, and particularly with an aldehyde of the class of $\alpha,\beta$-olefinic and conjugated diolefinic aldehydes designated by the formula $RR'C=CR^2CHO$, wherein R represents a member of the class consisting of hydrogen, the alkyl groups, the alkenyl groups, the aralkyl groups and the phenyl group; and R' and R², respectively, represent a member of the class consisting of hydrogen and the alkyl groups. The reaction is conducted in the presence of a small amount of the catalyst, usually ranging from 0.1% to 1.0% based upon the total weight of the reactants, while maintaining the reaction mixture at temperatures within the range from $-30°$ C. to $+40°$ C. Somewhat higher temperatures also can be used, depending upon the efficiency of the ketene absorption system. The reaction mixture then may be heated for a short time in order to facilitate the rearrangement of the lactone to the unsaturated acid. The latter then may be isolated by various means hereinafter described, depending upon the characteristics of the acid.

In reacting the ketene and aldehyde, the former can be passed through an excess of the aldehyde containing the catalyst, subsequently removing the excess aldehyde from the reaction products by distillation. However, such a procedure is usually undesirable because unsaturated aldehydes in general are quite sensitive to the catalyst employed, and particularly so to boron trifluoride which is the preferred catalyst. As a result, a considerable portion of the aldehyde undergoes a condensation of the aldol type, thereby seriously lowering the efficiency of the process.

Consequently, in order to reduce or eliminate the loss of aldehyde by condensation and resinification, it is preferred to introduce the ketene and the aldehyde simultaneously in approximately equi-molecular proportions into an inert solvent containing the catalyst. Solvents found very satisfactory for this purpose include ethers such as ethyl ether and isopropyl ether; aliphatic hydrocarbons; chlorinated hydrocarbons; and aromatic hydrocarbons. Benzene and toluene have proved particularly suitable for this service.

The intermediate polymeric products formed by the reaction of ketene and the unsaturated aldehydes in the manner herein described are readily converted to unsaturated carboxylic acids by treatment thereof with a strong mineral acid, either while in suspension in water or in solution in an inert water-soluble solvent; or after removal from such intermediate products of the solvent in which the initial reaction was conducted.

The procedure employed to separate the reaction products from the reaction mixture varies according to the nature of the unsaturated carboxylic acids produced. With relatively volatile acids, separation may be satisfactorily accomplished by distillation, usually conducted under subatmospheric pressure.

In certain instances where the solvent is removed from the reaction mixture and the residue heated at temperatures around 100° C. for the at least partial conversion of the intermediate product to the unsaturated acid, a material portion of the latter, because of the chemical unsaturation, may be lost due to resinification. This loss can be materially reduced by esterification of the intermediate reaction product with an alcohol such as methanol, ethanol, isopropanol and butanol, and the subsequent separation of the acid from the reaction mixture in the form of its methyl, ethyl or other ester by distillation. When using an alcohol as the esterifying agent, a part thereof unites with the olefinic bond of a portion of the β-lactone during the esterification, thereby producing substantial amounts of an alkoxy-substituted unsaturated carboxylic acid, as exemplified in Example 2. According to another procedure, the reaction product can be treated with dilute aqueous caustic soda, the caustic insoluble material extracted with a suitable solvent, and the unsaturated acid precipitated from the aqueous solution by acidification with a mineral acid.

The conversion of the intermediate product to the unsaturated acid, however, is best accomplished by the addition of a strong mineral acid such as sulfuric or hydrochloric acid to the said product either suspended in water or dissolved in a water-soluble solvent such as dioxane or glacial acetic acid. Glacial acetic acid is of particular value as the solvent when the unsaturated acids formed are fairly insoluble in this solvent and crystallize therefrom in a state of high purity, as in the case of styryl acrylic acid and of octatrienoic acid. On the other hand, the ketene-crotonaldehyde condensation product is most economically converted to sorbic acid by treatment with a 35% aqueous sulfuric acid solution after removal of the solvent in which the reaction was carried out.

The following examples serve to illustrate the invention:

*Example 1*

276 grams of crotonaldehyde and 162 grams of ketene were reacted by simultaneous addition of these compounds in equi-molecular ratio to 600 cc. of ethyl ether containing 4 grams of boron trifluoride maintained at around 0° C. To the resulting solution were added 1200 cc. of a 35% aqueous solution of sulfuric acid. After removing the ether, the residual mixture was slowly heated with stirring to 80° C. over a period of 3 hours. Filtration of the cooled mixture yielded crude sorbic acid crystals, from which pure sorbic acid was obtained by recrystallization from benzene. A yield of over 73% of the pure sorbic acid was secured.

*Example 2*

Over a period of 35 minutes, 56 grams (1.33 moles) of ketene and 90 grams (1.28 moles) of crotonaldehyde were added simultaneously in approximately an equi-molar ratio to a solution of 0.5 gram of boron trifluoride in 200 grams of toluene, maintained at a temperature ranging between 5° C. and 10° C. After completion of the reaction, toluene was stripped from the mixture under vacuum, leaving a partially crystalline residue to which were added ethanol, benzene and 0.7 gram of benzene sulfonic acid, and the resulting solution refluxed until esterification was complete. After removing the excess ethanol and benzene, the residue was fractionated under vacuum, giving a high yield of ethyl sorbate, which distilled at 78° C.–80° C. under an absolute pressure of 4 mm. of mercury.

Distillation of the crude ester thus obtained by directly esterifying the ketene-crotonaldehyde reaction product in benzene yielded—in addition to a fraction consisting principally of ethyl sorbate—a large fraction boiling at 65° C.–66° C. under 1 mm. of mercury absolute pressure. This fraction was saponified with a 10% aqueous solution of sodium hydroxide, and the resultant solution was acidified with hydrochloric acid and the oil which separated was extracted with toluene. After distillation of the toluene from the extract, and removal of crystallized sorbic acid therefrom by filtration, the filtrate was distilled, yielding a colorless, odorless, water-insoluble liquid that was identified as delta-ethoxy hexenoic acid,

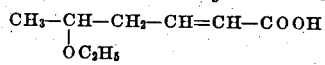

It has a boiling point of 112° C. under an absolute pressure of 2 mm. of mercury; a specific gravity at 20°/20° C. of 0.995; and a refractive index at 20° C. of 1.4524. The formation of this material indicates that a part of the ethanol united with the olefine bonds of the polymeric β-lactone during the esterification process. Saponification of this ester with strong caustic splits off the ethoxy group to yield sorbic acid.

In like manner butyl sorbate was produced by esterifying with butanol the crude reaction residue produced by reacting ketene and crotonaldehyde in the manner described in Example 2. The butyl sorbate distilled at 66° C. under an absolute pressure of 1 mm. of mercury, and had a specific gravity at 20° C. of 0.9252.

*Example 3*

Following the procedure described in Example 2, 216 grams of ethyl crotonaldehyde and 94 grams of ketene were added simultaneously to a solution of 1.2 grams of boron trifluoride in 260 grams of toluene maintained at about 0° C. After stripping off the toluene, the residue was distilled under vacuum, yielding a distillate rich in ethyl sorbic acid which, upon recrystallization from benzene, was secured in the form of colorless prisms which melted at 78° C.–80° C.

By reacting the aforesaid residue, after removal of the toluene, with ethanol, in the presence of benzene and of benzene sulfonic acid, in the general manner described in Example 2, a very satisfactory yield of ethyl 3-ethyl sorbate,

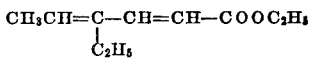

was secured. This compound boils at 80° C. under an absolute pressure of 3 mm. of mercury; and has a specific gravity at 20°/20° C. of 0.9386; and a refractive index at 20° C. of 1.4908. 3-ethyl sorbic acid, obtained from the ester by hydrolysis, is a colorless crystalline solid melting between 78° C. and 80° C.

*Example 4*

46 grams of crotonaldehyde and 27 grams of ketene were reacted by simultaneous addition thereof in equal molar proportions over a period of 12 minutes to 245 grams of ethyl ether containing 2 grams of aluminum chloride, while maintaining the reaction mixture at a temperature ranging between −15° C. and +15° C. After completion of the reaction, 200 cc. of a 35% aqueous solution of sulfuric acid were added, and the ether stripped off under vacuum. The residue then was heated at 70° C. with agitation for 1.5 hours. It then was cooled and filtered, and the crude sorbic acid was purified by recrystalization from benzene, thereby yielding around 40% of pure sorbic acid.

*Example 5*

Following the general procedure described in Example 4, 23 grams of crotonaldehyde and 13 grams of ketene were reacted in 119 grams of ethyl ether containing 2 grams of concentrated sulfuric acid. After completion of the condensation reaction, 100 cc. of a 35% aqueous solution of sulfuric acid were added, and the reaction mixture treated in the manner described in Example 4. A considerably smaller yield of pure sorbic acid was secured here than in Example 4.

Considerably higher yields of sorbic acid were obtained by reacting ketene with crotonaldehyde under conditions similar to those recited in Example 4, but using (1) ferric chloride, and (2) benzene sulfonic acid, respectively, as catalysts.

*Example 6*

Ketene was passed into a solution of 216 grams of benzaldehyde and 0.5 gram of boron trifluoride in 200 grams of toluene, maintained at 10° C., until 43 grams of ketene had been absorbed. After removal of the toluene and excess benzaldehyde, the residue was treated with an excess of a dilute aqueous solution of sodium hydroxide, the alkali-insoluble material extracted with toluene, and the aqueous layer treated with decolorizing carbon. Upon acidification of the aqueous layer with hydrochloric acid, cinnamic acid was precipitated, a yield of approximately 42%, based upon the ketene being secured.

*Example 7*

200 grams of cinnamaldehyde and 64 grams of ketene were reacted by simultaneous addition thereof in approximately equal molar proportions to 400 grams of ethyl ether containing 2 grams of boron trifluoride, and maintained at 0° C. To the resultant solution, containing the condensation products, were added 450 cc. of glacial acetic acid, and the ether was stripped from the mixture by distillation under vacuum. 225 cc. of 6-normal hydrochloric acid then were added to the acetic acid solution, and the mixture was agitated for 2 hours while maintained at temperatures within the range between 40° C. and 50° C., during which time 208 grams of pure styryl acrylic acid precipitated and were filtered off. 200 cc. of water were added to the filtrate and, after standing overnight, yielded an additional 16 grams of the said acid, thereby providing a total yield of around 85% thereof, based upon the ketene.

*Example 8*

44 grams of 2,4-hexadienal-1 and 19 grams of ketene were reacted in 280 grams of ethyl ether containing 0.5 gram of boron trifluoride, following the procedure described in Example 7. 150 cc. of glacial acetic acid then were added to the resultant reaction mixture, and the ether was removed under vacuum. Upon adding 75 cc. of 6-normal hydrochloric acid to the acetic acid solution, a slight temperature rise occurred and crystalline octatrienoic acid separated. After standing overnight and filtering the mixture, a yield of around 54% of the said acid was secured. Octatrienoic acid occurs as a pale yellow crystalline material which melts at 201°–203° C.

*Example 9*

A good yield of sorbic acid was obtained by reacting 46 grams of crotonaldehyde with 27 grams of ketene in toluene containing 2 grams of a boric acid-salicylic acid catalyst, following the general procedure set forth in Example 8. The catalyst was prepared by heating together at 150° C. equal molecular quantities of boric acid and salicylic acid. After cooling the crystalline mass was ground to a fine powder before use.

Somewhat similar results were secured by substituting for the mixed boric acid-salicylic acid catalyst a mixed boric acid-oxalic acid catalyst made by heating together for several minutes at 130° C. equal molecular quantities of boric acid and anhydrous oxalic acid. The crystalline mass, after cooling, was ground to a fine powder.

Somewhat lower yields of sorbic acid are securable by substituting for the aforesaid catalyst in the process a suspension of boron triacetate in toluene. The boron triacetate was made by reacting boric acid and acetic anhydride, and filtering and washing with ether the boron triacetate thus formed.

*Example 10*

A stream of ketene was passed through a body of 363 grams of crotonaldehyde containing one gram of boron trifluoride and maintained below 20° C. until 88 grams of ketene had been absorbed and reacted. The excess crotonaldehyde was stripped from the resultant reaction mixture by distillation. The residue was a dark tarry mass. One hundred grams of such residue were neutralized by adding it to an aqueous solution of caustic soda, and the mixture was treated with a decolorizing absorbent carbon, and then was acidified with hydrochloric acid and filtered. The filtrate yielded 21 grams of sorbic acid by crystallization.

It is unnecessary to employ pure gaseous ketene in the process. On the contrary, there may be employed as a source of ketene the gaseous products of the pyrolysis of acetone from which excess acetone has been removed by condensation; or ketene generated by the thermal decomposition of diketene may be used.

In connection with the preferred practice of the invention wherein boron trifluoride is utilized as the condensing agent or catalyst, it is generally desirable to introduce the boron trifluoride into the reaction mixture in the form of its ethyl ether complex, in which form it resists loss from the sphere of the reaction by vaporization, while retaining its outstanding catalytic activity.

The unsaturated carboxylic acids produced by reactions between ketene and the class of unsaturated aliphatic and aromatic aldehydes may find application as substitutes for saturated carboxylic acids of similar molecular weight for many purposes. Furthermore, the presence of at least one double bond in these compounds points to their use as intermediates for the synthesis of a wide variety of compounds, by a suitable treatment of these unsaturated acids with halogens, halogen acids, hypohalites, ammonia, the amines, etc. The esters of the higher unsaturated carboxylic acids have properties indicating their suitability as solvents and plasticizers; while the esters and the nitriles of the lower unsaturated acids appear of interest as starting materials for the production of polymers and copolymers thereof of industrial value.

While a considerable number of strong acidic catalysts useful in the process have been named, it will be understood that other strong acidic catalysts may be somewhat less effectively employed for the purpose. Boron halides such as boron trifluoride provide results in procedure and in high yields rendering this type of catalyst of outstanding value in the process.

This application is a continuation-in-part of my copending application, Serial No. 641,646, filed January 16, 1946, now abandoned, which, in turn, is a continuation of my application, Serial No. 428,866, filed January 30, 1942, now abandoned.

The invention is susceptible of modification within the scope of the appended claims.

I claim:

1. In a process for producing an unsaturated carboxylic acid, the step which comprises reacting ketene and an α,β-olefinic aldehyde having only carbon and hydrogen in the molecule in addition to the aldehyde group, at temperatures within the range between −30° C. and +40° C. in the presence of an acidic condensing agent, thereby producing an intermediate product that is convertible to an unsaturated carboxylic acid by reacting it with a strong mineral acid.

2. Process for producing an unsaturated carboxylic acid, which comprises reacting ketene and an α,β-olefinic aldehyde having only carbon and hydrogen in the molecule in addition to the aldehyde group, in the presence of an acidic condensing agent, while maintaining the reaction mixture within the range between −30° C. and +40° C., converting the intermediate product thus formed to an unsaturated carboxylic acid, and recovering the latter.

3. Process for producing an unsaturated carboxylic acid, which comprises reacting ketene and an α,β-olefinic aldehyde having only carbon and hydrogen in the molecule in addition to the aldehyde group, in the presence of an inert volatile solvent and an acidic condensing agent, while maintaining the reaction mixture at a temperature within the range between −30° C. and +40° C., converting the intermediate product thus formed to an unsaturated carboxylic acid, and recovering the latter.

4. Process for producing an ester of an unsaturated carboxylic acid, which comprises reacting ketene and an α,β-olefinic aldehyde having only carbon and hydrogen in the molecule in addition to the aldehyde group, in the presence of an acidic condensing agent, while maintaining the reaction mixture at a temperature within the range between around −30° C. and around +40° C., subjecting the resultant mixture to esterification with an aliphatic alcohol in the presence of an esterification catalyst, and recovering the ester thus produced.

5. Process for producing an unsaturated carboxylic acid, which comprises reacting ketene and an α,β-olefinic aldehyde having only carbon and hydrogen in the molecule in addition to the aldehyde group, in the presence of an acidic boron-containing condensing agent, at temperatures within the range between −30° C. and +40° C., converting the intermediate product thus formed to an unsaturated carboxylic acid, and recovering the latter.

6. Process for producing a polyenic unsaturated carboxylic acid, which comprises reacting ketene and an α,β-unsaturated diolefinic aldehyde having only carbon and hydrogen in the molecule in addition to the aldehyde group, at temperatures within the range between −30° C. and +40° C., in the presence of an acidic boron-containing condensing agent, converting the intermediate product thus formed to an unsaturated carboxylic acid, and recovering the latter.

7. Process for producing an unsaturated carboxylic acid, which comprises concurrently introducing ketene and an α,β-olefinic aldehyde having only carbon and hydrogen in the molecule in addition to the aldehyde group, in approximately equi-molecular proportions into a solution of a volatile halide of a trivalent metal in an inert volatile solvent, while maintaining the reaction mixture at a temperature within the range between −30° C. and +40° C., removing the solvent from the reaction mixture, converting the residual intermediate product to the said unsaturated acid, and recovering the latter.

8. Process for producing an unsaturated carboxylic acid, which comprises reacting ketene with an α,β-olefinic aldehyde having only carbon and hydrogen in the molecule in addition to the aldehyde group, in the presence of aluminum chloride, while maintaining the reaction mixture at a temperature within the range between around −30° C. and around +40° C., converting the aldehyde-ketene condensation product thus formed to said unsaturated carboxylic acid, and recovering the latter.

9. Process for producing an unsaturated carboxylic acid, which comprises reacting ketene and an α,β-olefinic aldehyde having only carbon and hydrogen in the molecule in addition to the aldehyde group, in the presence of an acidic condensing agent, while maintaining the reaction mixture at a temperature within the range between −30° C. and +40° C., and reacting the intermediate product with a strong mineral acid at a temperature within the range between around 80° C. and around 100° C., thereby converting the intermediate product to an unsaturated carboxylic acid, and recovering the latter.

10. Process for producing an unsaturated carboxylic acid, which comprises concurrently introducing successive portions of ketene and of an α,β-olefinic aldehyde having only carbon and hydrogen in the molecule in addition to the aldehyde group in approximately equi-molecular proportions into a solution of an acidic condensing agent in a volatile solvent for the reactants which is inert thereto, while maintaining the reaction mixture at a temperature within the range between $-30°$ C. and $+40°$ C., removing the solvent from the reaction mixture, reacting the intermediate product present in the latter with a strong mineral acid, thereby converting the aldehyde-ketene condensation product to said unsaturated carboxylic acid, and recovering the latter.

11. Process for producing an unsaturated carboxylic acid, which comprises reacting ketene and an α,β-olefinic aldehyde having only carbon and hydrogen in the molecule in addition to the aldehyde group, in the presence of boron trifluoride, while maintaining the reaction mixture at a temperature within the range between around $-30°$ C. and around $+40°$ C., reacting the intermediate product thus produced with a strong mineral acid, thereby converting the aldehyde-ketene condensation product to the said unsaturated carboxylic acid, and recovering the latter.

12. Process for producing an at least doubly-unsaturated carboxylic acid, which comprises concurrently introducing ketene and an α,β-olefinic aldehyde having only carbon and hydrogen in the molecule in addition to the aldehyde group in approximately equi-molecular proportions into a solution of boron trifluoride in a volatile solvent for the reactants which is inert thereto, while maintaining the reaction mixture at a temperature within the range between $-30°$ C. and $+40°$ C., removing the solvent from the reaction mixture, reacting the intermediate product present in the latter with a strong mineral acid, thereby converting the aldehyde-ketene condensation product to said unsaturated carboxylic acid, and recovering the latter.

13. Process for producing an at least doubly-unsaturated carboxylic acid, which comprises concurrently introducing ketene and an α,β-olefinic aldehyde having only carbon and hydrogen in the molecule in addition to the aldehyde group in approximately equi-molecular proportions into a solution of boron trifluoride in the form of its ethyl ether complex in a volatile solvent for the reactants which is inert thereto, while maintaining the reaction mixture at a temperature within the range between $-30°$ C. and $+40°$ C., removing the solvent from the reaction mixture, reacting the intermediate product present in the latter with a strong mineral acid, thereby converting the aldehyde-ketene condensation product to said unsaturated carboxylic acid, and recovering the latter.

14. Process for producing a product that is convertible to sorbic acid by treatment with an aqueous solution of a strong mineral acid, which process comprises reacting ketene with crotonaldehyde in the presence of an acidic condensing agent.

15. In the process for producing sorbic acid, the step which comprises reacting ketene and crotonaldehyde in the presence of an acidic condensing agent.

16. In the process for producing sorbic acid, the step which comprises reacting ketene and crotonaldehyde in the presence of an acidic condensing agent and of an inert volatile solvent for the reactants.

17. In the process for producing sorbic acid, the step which comprises reacting ketene and crotonaldehyde in solution in an inert volatile solvent for the reactants at temperatures within the range between $-30°$ C. and $+40°$ C., in the presence of an acidic condensing agent.

18. Process for producing sorbic acid, which comprises concurrently introducing ketene and crotonaldehyde into a solution of an acidic condensing agent in a volatile inert solvent for the reactants, while maintaining the mixture at a temperature within the range between $-30°$ C. and $+40°$ C., removing the solvent from the reaction mixture, converting the residual polymeric condensation product to sorbic acid, and recovering the latter.

ALBERT B. BOESE, Jr.

REFERENCES CITED

The following references are of record in the file of this patent:

UNITED STATES PATENTS

| Number | Name | Date |
|---|---|---|
| 2,158,031 | Loder | May 9, 1939 |
| 2,265,165 | Hopff et al. | Dec. 9, 1941 |
| 2,421,976 | Agett | June 10, 1947 |

OTHER REFERENCES

Staudinger, Ber. Deut. Chem., vol. 42, pp. 4249–4262 (1909).

Hurd et al., J. Am. Chem. Soc., vol. 55, pp. 275–283 (1933).

Williams et al., J. Am. Chem. Soc., vol. 62, pp. 2801–2803 (1940).

Medawar et al., Nature, vol. 151, p. 195 (1943).